United States Patent
Hayashi

(10) Patent No.: US 7,961,662 B2
(45) Date of Patent: Jun. 14, 2011

(54) MOBILE COMMUNICATION SYSTEM AND MBMS SERVICE RELEVANT INFORMATION TRANSFER METHOD FOR USE THEREWITH

(75) Inventor: Sadafuku Hayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 1002 days.

(21) Appl. No.: 11/124,257

(22) Filed: May 9, 2005

(65) Prior Publication Data

US 2005/0249188 A1    Nov. 10, 2005

(30) Foreign Application Priority Data

May 7, 2004 (JP) ................................ 2004-138311

(51) Int. Cl.
*H04H 20/71* (2008.01)
*H04J 3/24* (2006.01)
(52) U.S. Cl. ................. 370/312; 370/349; 370/401
(58) Field of Classification Search ............. 370/312, 370/349, 401
See application file for complete search history.

(56) References Cited

U.S. PATENT DOCUMENTS

| | | | |
|---|---|---|---|
| 6,961,571 B1* | 11/2005 | Rune et al. | 455/442 |
| 2003/0153309 A1* | 8/2003 | Bjelland et al. | 455/432 |
| 2004/0096041 A1* | 5/2004 | Beckmann et al. | 379/1.01 |
| 2004/0157603 A1* | 8/2004 | Hurtta et al. | 455/434 |
| 2005/0030958 A1* | 2/2005 | Laiho et al. | 370/401 |
| 2005/0075099 A1* | 4/2005 | Guyot | 455/414.1 |
| 2006/0140159 A1* | 6/2006 | Choi et al. | 370/336 |
| 2006/0154627 A1* | 7/2006 | Wang et al. | 455/130 |
| 2007/0232308 A1* | 10/2007 | Bergstrom et al. | 455/436 |

FOREIGN PATENT DOCUMENTS

| | | |
|---|---|---|
| JP | 2003-515995 | 5/2003 |
| JP | 2003-319466 | 11/2003 |
| WO | WO 2004/017580 A1 | 2/2004 |
| WO | WO 2004/064342 A1 | 7/2004 |

OTHER PUBLICATIONS

Non-Patent Document "Multimedia Broadcast Multicast Service" (3GPP TS23.246 version 6.0.0 Sep. 2003).

3GPP: 3GPP TS 23. 060 V.6.4.0 (Mar. 2004); "$3^{rd}$ Generation Partnership Project; Technical Specification Group Services and System Aspects; General Packet Radio Service (GPRS); Service description; Stage 2 (Release 6)" [Online] Mar. 2004, pp. 69-76, XP-000863880, retrieved from the Internet: URL:http://www.3gpp.org/ftp/Specs/html-info/23060.htm>.

(Continued)

*Primary Examiner* — Barry W Taylor
(74) *Attorney, Agent, or Firm* — Young & Thompson

(57) ABSTRACT

The present invention provides a mobile communication system in which a target Radio Network Controller can decide the PtP method or PtM method correctly, and notify that the contents data of an MBMS service starts to be transferred to the radio terminal. A source Radio Network Controller sets up the relevant information of the MBMS service joined by a radio terminal in a Relocation Required message, and transmits it to an SGSN4. The SGSN4 transmits a Relocation Request message to the target Radio Network Controller. The target Radio Network Controller sets up the radio resources to perform the communication with the radio terminal, and stores the relevant information of the MBMS service in the Relocation Required message in memory.

32 Claims, 10 Drawing Sheets

OTHER PUBLICATIONS

3GPP: 3GPP TS 23. 846 V.6.1.0 (Dec. 2002); "3$^{rd}$ Generation Partnership Project; Technical Specification Group Services and System Aspects; Multimedia Broadcast/Multicast Service (MBMS); Architecture and functional description (Release 6)"[Online] Dec. 2002, pp. 36-39, XP000863881 retrieved from the Internet: URL:http://www.3gpp.org/ftp/Specs/html-info/23846.htm>.

3GPP TS 23. 246 V.6.2.0 (Mar. 2004); "3$^{rd}$ Generation Partnership Project; Technical Specification Group Services and System Aspects; Multimedia Broadcast/Multicast Service (MBMS); Architecture and functional description (Release 6)" Online! Mar. 2004, pp. 1-40, XP-002340182, retrieved from the Internet: URL:http://www.3gpp.org/ftp/Specs/html-info/23246.htm>.

ETSI TR 125 992 V6.0.0 (Sep. 2003); "Digital cellular telecommunications system (Phase 2+); Universal Mobile Telecommunications System (UMTS); Multimedia Broadcast/Multicast Service (MBMS); UTRAN/GERAN requirements (3GPP TR 25.992 version 6.0.0 Release 6)", vol. 3-R, No. V600, pp. 1-11, Sep. 2003, XP-014015764.

3GPP: 3GPP TS 23.060 V.6.4.0. (Mar. 2004) 3$^{rd}$ Generation Partnership Project; Technical Specification Group Services and System Aspects; General Packet Radio Service (GPRS); Service description; Stage 2 (Release 6), Mar. 2004, pp. 69-80.

Japanese Patent Office issued a Japanese Office Action dated Jun. 9, 2009, Application 2005-115193.

* cited by examiner

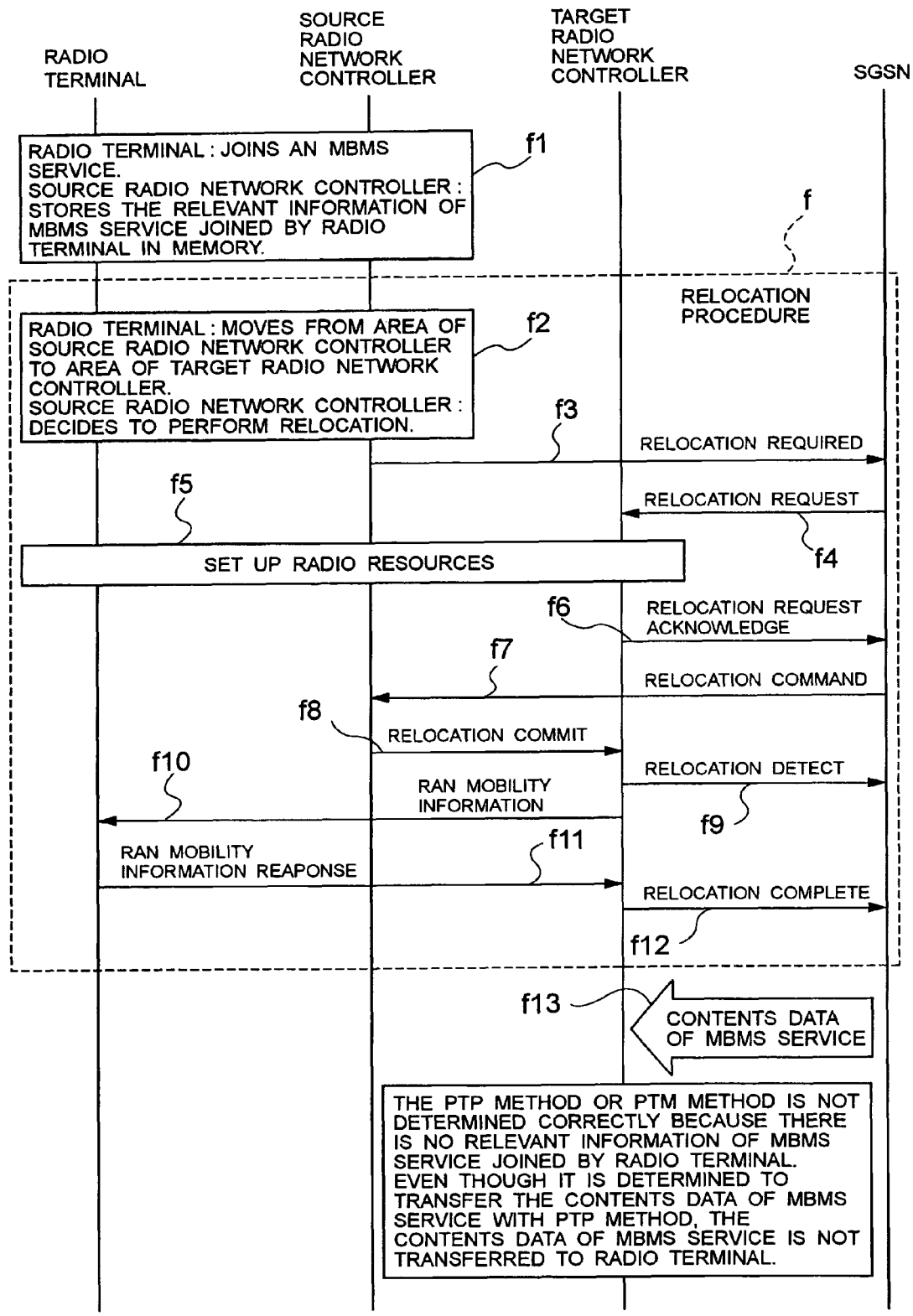

MOBILE COMMUNICATION SYSTEM AND MBMS SERVICE RELEVANT INFORMATION TRANSFER METHOD FOR USE THEREWITH

BACKGROUND OF THE INVENTION

1. Field of the Invention

The present invention relates to a mobile communication system and an MBMS service relevant information transfer method for use therewith, and more particularly to a multicast service MBMS (Multimedia Broadcast Multicast Service) for use with the mobile communication system.

2. Description of the Prior Art

Multicast in the mobile communication system is referred to as MBMS, and has a function of distributing the same contents data to the radio terminals (UE: User Equipment) existing in a cell.

Radio Network Controller (RNC) with the MBMS function finds the number of radio terminals (UE: User Equipment) existing in a cell and joining an MBMS service to receive the contents data and determines whether the contents data is transferred to each radio terminal in the cell with a PtP (Point to Point) method or a PtM (Point to Multipoint) method.

That is, if the number of radio terminals is greater than a threshold preset in the Radio Network Controller, the contents data is transferred with the PtM method, or conversely, if the number of radio terminals is smaller than the threshold, the contents data is transferred with the PtP method.

When the contents data is transferred with the PtP method, it is meant that the contents data is transferred on a wireless dedicated channel, and when the contents data is transferred with the PtM method, it is meant that the contents data is transferred on a wireless common channel. Whether the contents data is transferred with the PtP method or PtM method is determined depending on the number of radio terminals, taking into consideration to save the radio transmission power.

A method of the Radio Network Controller to find the number of radio terminals in the cell involves transmitting an MBMS Notification message and counting the number of radio terminals responding to the MBMS Notification message (e.g., refer to Non-Patent Document 1).

An MBMS control process of the Radio Network Controller will be described below. FIGS. 4 and 5 are context information stored within the memory of the Radio Network Controller. The context information of FIG. 4 is called "UE Context", and the context information of FIG. 5 is called "MBMS Service Context".

The "UE Context" of FIG. 4 stores the information for the Radio Network Controller to control the radio terminal when the radio terminal performs the normal communication (voice communication or packet communication), including IMSI (International Mobile Subscriber Identity: fixed identifier for radio terminal), RRC (Radio Resource Control) State, RAB (Radio Access Bearer) Info, and positional information (cell information in which the radio terminal is located). This "UE Context" is generated by the Radio Network Controller, when the radio terminal starts to perform the normal communication (voice communication or packet communication) with the network.

The "MBMS Service Context" of FIG. 5, given for each MBMS service, stores the information for the Radio Network Controller to control the MSMB service, including IP (Internet Protocol) Multicast Address (IP address of a server sending out the contents data of MBMS service), APN (Access Point Name: GGSN (Gateway GPRS (General Packet Radio Service) Support Node) in this embodiment), MBMS service ID (MBMS service identifier), MBMS RAB Info (RAB information for transferring the contents data of MBMS service) and the IMSI of the radio terminal having joined the MBMS service for each cell.

The Radio Network Controller generates this "MBMS Service Context" when receiving a Session Start Message from the SGSN (Service GPRS Support Node) (see e1 to e11 in FIG. 10). Besides, the Radio Network Controller generates the "MBMS Service Context" when starting the normal communication (voice communication or packet communication) after the radio terminal joins the MBMS service. At this time, the Radio Network Controller also generates the "MBMS UE Context Info" as shown in FIG. 4 and stores it in the "UE Context".

If the Radio Network Controller generates the "MBMS Service Context" when starting the normal communication (voice communication or packet communication) after the radio terminal joins the MBMS service, the Radio Network Controller can find the number of radio terminals having joined the MBMS service at the later time when receiving a Session Start message from the SGSN, and determine whether the contents data of MBMS service is transferred with the PtP method or PtM method.

The Radio Network Controller transmits an MBMS Notification message on the wireless common channel, after receiving the Session Start message, to notify that the contents data of MBMS service starts to be transferred soon.

Also, the radio terminal may not be able to receive the MBMS Notification message transmitted on the wireless common channel, depending on its state. For example, the radio terminal is unreceivable on the wireless common channel while communicating on the dedicated channel. In this case, the Radio Network Controller, seeing an RRC State in the "UE Context" of FIG. 4, transmits the MBMS Notification message to the radio terminal on the dedicated channel and informs that the contents data of MBMS service is transferred soon, if the radio terminal is in a state not capable of receiving the MBMS Notification message on the wireless common channel (e.g., a state where it is communicating on the dedicated channel).

The Radio Network Controller managing the radio terminals in communication with the network is referred to as a serving Radio Network Controller (Serving RNC) and manages the movement of radio terminals with the "UE Context".

When the radio terminal moves from an area of the Serving RNC to an area of the Radio Network Controller adjacent to it, the serving Radio Network Controller performs the Relocation to pass a management right of the radio terminal to the Radio Network Controller of movement destination for the line utilization efficiency.

The serving Radio Network Controller becomes the Radio Network Controller of relocation source during execution of a relocation procedure. This Radio Network Controller of relocation source is referred to as a source Radio Network Controller (Source RNC), and the Radio Network Controller of relocation destination is referred to as a target Radio Network Controller (Target RNC).

When the relocation is performed, according to the present system specifications, the relevant information ("MBMS UE Context Info" in FIG. 4) of an MBMS service joined by the radio terminal is not notified from the source Radio Network Controller to the target Radio Network Controller of relocation destination, although the radio terminal joins the MBMS service.

Specifically, in FIGS. 2, 3 and 11, it is supposed that the radio terminal joins a certain MBMS service while communicating with the network in the area of the source Radio Network Controller (in the state of FIG. 2). The source Radio Network Controller stores the relevant information of the MBMS service joined by the radio terminal in memory (generates the "MBMS UE Context" of FIG. 4) in a procedure in which the radio terminal joins the MBMS service (f1 in FIG. 11). The reason of storing the relevant information in memory is to determine whether the PtP method or PtM method is employed.

The radio terminal moves from the area of the source Radio Network Controller to the area of the target Radio Network Controller, and the source Radio Network Controller decides to perform the relocation procedure (f2 in FIG. 11).

The source Radio Network Controller transmits a Relocation Required message to the SGSN (f3 in FIG. 11), and the SGSN transmits a Relocation Request message to the target Radio Network Controller (f4 in FIG. 11). At this time, the relevant information of the MBMS service joined by the radio terminal is not transferred to the target Radio Network Controller in accordance with the conventional specifications.

Since the relevant information of the MBMS service joined by the radio terminal is not transferred, the "MBMS UE Context Info" does not exist in the "UE Context" (see FIG. 4) at the target Radio Network Controller, and the IMSI of the radio terminal is not stored in the "MBMS Service Context" (see FIG. 5) (f5 to f13 in FIG. 11).

[Non-Patent Document 1] "Multimedia Broadcast Multicast Service" (3GPP TS23.246 version 6.0.0 2003-09).

BRIEF SUMMARY OF THE INVENTION

The conventional relocation procedure as above can not perform the following, because the target Radio Network Controller does not know the relevant information of the MBMS service joined by the radio terminal during relocation, even though a Session Start message (see FIG. 10) signifying that the contents data of the MBMS service joined by the radio terminal starts to be transferred is transmitted from the SGSN, after the procedure is ended (state of FIG. 3).

(1) The target Radio Network Controller does not have the relevant information of the MBMS service joined by the radio terminal even though the radio terminal joins the MBMS service, whereby it is not possible to correctly determine the transfer method (PtP method or PtM method) for the contents data of the MBMS service.

(2) The target Radio Network Controller receives a Session Start message from the SGSN (see FIG. 10), and transmits an MBMS Notification message on the wireless common channel to notify that the contents data of the MBMS service is transferred soon.

However, the target Radio Network Controller, which has no relevant information of the MBMS service joined by the radio terminal, does not transmit the MBMS Notification message on the dedicated channel to the radio terminal, even though the radio terminal is unreceivable on the wireless common channel at that time. Hence, the radio terminal can not know that the contents data of MBMS service is transferred soon.

(3) The target Radio Network Controller has no relevant information of the MBMS service joined by the radio terminal, even though the radio terminal joins the MBMS service, whereby the radio terminal is not dealt with even if the contents data of the MBMS service is transferred with the PtP method.

Therefore, when the target Radio Network Controller decides to transfer the contents data of the MBMS service with the PtP method, the radio terminal can not receive the contents data of the MBMS service.

Thus, it is an object of the present invention to solve the above-mentioned problems, and provide a mobile communication system and a relevant information transfer method of MBMS service for use therewith in which the target Radio Network Controller can decide the PtP method or the PtM method correctly, and notify that the contents data of MBMS service starts to be transferred to the radio terminal.

A first mobile communication system according to the present invention is a mobile communication system for performing a service of distributing the same data to a plurality of radio terminals via a network connecting a plurality of Radio Network Controllers, wherein transfer means for transferring the relevant information of the service held at the radio terminal to a Radio Network Controller of movement destination with a processing of passing a management right of the radio terminal to the Radio Network Controller of movement destination as a momentum is provided in either the Radio Network Controller of movement source managing the radio terminal or the network.

A second mobile communication system according to the invention is a mobile communication system for performing an MBMS (Multimedia Broadcast Multicast Service) service of distributing the same contents data to the radio terminals existing in a cell via an SGSN (Service GPRS Support Node), wherein transfer means for transferring the relevant information of the MBMS service joined by the radio terminal to a target Radio Network Controller with a relocation processing of passing a management right of the radio terminal to the target Radio Network Controller of movement destination as a momentum is provided in either a source Radio Network Controller managing the radio terminal or the SGSN.

A third mobile communication system according to the invention is a mobile communication system for performing a service of distributing the same data to a plurality of radio terminals via a network connecting a plurality of Radio Network Controllers, wherein transfer means for transferring the relevant information of the service held at the radio terminal to a Radio Network Controller of movement destination during execution of a processing for passing a management right of the radio terminal to the Radio Network Controller of movement destination is provided in the Radio Network Controller of movement source managing the radio terminal.

A fourth mobile communication system according to the invention is a mobile communication system for performing an MBMS (Multimedia Broadcast Multicast Service) service of distributing the same contents data to the radio terminals existing in a cell via an SGSN (Service GPRS Support Node), wherein transfer means for transferring the relevant information of the MBMS service joined by the radio terminal to a target Radio Network Controller during execution of a relocation processing for passing a management right of the radio terminal to the target Radio Network Controller of movement destination is provided in a source Radio Network Controller managing the radio terminal.

A fifth mobile communication system according to the invention is a mobile communication system for performing a service of distributing the same data to a plurality of radio terminals via a network connecting a plurality of Radio Network Controllers, wherein transfer means for transferring the relevant information of the service held at the radio terminal to a Radio Network Controller of movement destination during execution of a processing for passing a management right of the radio terminal to the Radio Network Controller of movement destination is provided in the network.

A sixth mobile communication system according to the invention is a mobile communication system for performing an MBMS (Multimedia Broadcast Multicast Service) service of distributing the same contents data to the radio terminals existing in a cell via an SGSN (Service GPRS Support Node), wherein transfer means for transferring the relevant information of the MBMS service joined by the radio terminal to a target Radio Network Controller during execution of a relocation processing for passing a management right of the radio terminal to the target Radio Network Controller of movement destination is provided in the SGSN.

A seventh mobile communication system according to the invention is a mobile communication system for performing a service of distributing the same data to a plurality of radio terminals via a network connecting a plurality of Radio Network Controllers, wherein transfer means for transferring the relevant information of the service held at the radio terminal to a Radio Network Controller of movement destination after completion of a processing for passing a management right of the radio terminal to the Radio Network Controller of movement destination is provided in the service.

An eighth mobile communication system according to the invention is a mobile communication system for performing an MBMS (Multimedia Broadcast Multicast Service) service of distributing the same contents data to the radio terminals existing in a cell via an SGSN (Service GPRS Support Node), wherein transfer means for transferring the relevant information of the MBMS service joined by the radio terminal to a target Radio Network Controller after completion of a relocation processing for passing a management right of the radio terminal to the target Radio Network Controller of movement destination is provided in the SGSN.

A first service relevant information transfer method according to the present invention is a service relevant information transfer method for use with a mobile communication system for performing a service of distributing the same data to a plurality of radio terminals via a network connecting a plurality of Radio Network Controllers, wherein a transfer step of transferring the relevant information of the service held at the radio terminal to a Radio Network Controller of movement destination with a processing for passing a management right of the radio terminal to the Radio Network Controller of movement destination as a momentum is provided on either the Radio Network Controller of movement source managing the radio terminal or the network.

A second MBMS service relevant information transfer method according to the invention is an MBMS service relevant information transfer method for use with a mobile communication system for performing an MBMS (Multimedia Broadcast Multicast Service) service of distributing the same contents data to the radio terminals existing in a cell via an SGSN (Service GPRS Support Node), wherein a transfer step of transferring the relevant information of the MBMS service joined by the radio terminal to a target Radio Network Controller with a relocation processing for passing a management right of the radio terminal to the target Radio Network Controller of movement destination as a momentum is provided on either the source Radio Network Controller managing the radio terminal or the SGSN.

A third service relevant information transfer method according to the invention is a service relevant information transfer method for use with a mobile communication system for performing a service of distributing the same data to a plurality of radio terminals via a network connecting a plurality of Radio Network Controllers, wherein a transfer step of transferring the relevant information of the service held at the radio terminal to a Radio Network Controller of movement destination during execution of a processing for passing a management right of the radio terminal to the Radio Network Controller of movement destination is provided on the Radio Network Controller of movement source managing the radio terminal.

A fourth MBMS service relevant information transfer method according to the invention is an MBMS service relevant information transfer method for use with a mobile communication system for performing an MBMS (Multimedia Broadcast Multicast Service) service of distributing the same contents data to the radio terminals existing in a cell via an SGSN (Service GPRS Support Node), wherein a transfer step of transferring the relevant information of the MBMS service joined by the radio terminal to a target Radio Network Controller during execution of a relocation processing for passing a management right of the radio terminal to the target Radio Network Controller of movement destination is provided on the source Radio Network Controller managing the radio terminal.

A fifth service relevant information transfer method according to the invention is a service relevant information transfer method for use with a mobile communication system for performing a service of distributing the same data to a plurality of radio terminals via a network connecting a plurality of Radio Network Controllers, wherein a transfer step of transferring the relevant information of the service held at the radio terminal to a Radio Network Controller of movement destination during execution of a processing for passing a management right of the radio terminal to the Radio Network Controller of movement destination is provided on the network.

A sixth MBMS service relevant information transfer method according to the invention is an MBMS service relevant information transfer method for use with a mobile communication system for performing an MBMS (Multimedia Broadcast Multicast Service) service of distributing the same contents data to the radio terminals existing in a cell via an SGSN (Service GPRS Support Node), wherein a transfer step of transferring the relevant information of the MBMS service joined by the radio terminal to a target Radio Network Controller during execution of a relocation processing for passing a management right of the radio terminal to the target Radio Network Controller of movement destination is provided on the SGSN.

A seventh service relevant information transfer method according to the invention is a service relevant information transfer method for use with a mobile communication system for performing a service of distributing the same data to a plurality of radio terminals via a network connecting a plurality of Radio Network Controllers, wherein a transfer step of transferring the relevant information of the service held at the radio terminal to a Radio Network Controller of movement destination after completion of a processing for passing a management right of the radio terminal to the Radio Network Controller of movement destination is provided on the network.

An eighth MBMS service relevant information transfer method according to the invention is an MBMS service relevant information transfer method for use with a mobile communication system for performing an MBMS (Multimedia Broadcast Multicast Service) service of distributing the same contents data to the radio terminals existing in a cell via an SGSN (Service GPRS Support Node), wherein a transfer step of transferring the relevant information of the MBMS service joined by the radio terminal to a target Radio Network Controller after completion of a relocation processing for passing a management right of the radio terminal to the target Radio Network Controller of movement destination is provided on the SGSN.

That is, the MBMS service relevant information transfer method of the invention involves the Relocation procedure for passing a management right of the radio terminal (UE: User Equipment) to the Radio Network Controller of movement destination, in which the source Radio Network Controller (Source RNC) managing the radio terminal that performs the normal communication with the network transfers the relevant information of the MBMS (Multimedia Broadcast Multicast Service) service joined by the radio terminal to the target Radio Network Controller (Target RNC) indicating the relocation destination. Herein, the relevant information of the MBMS service includes, for example, the MBMS service identifier, IP (Internet Protocol) multicast address, and APN (Access Point Name).

In the MBMS service relevant information transfer method of the invention, the relevant information of the MBMS service joined by the radio terminal is transferred using a Relocation Required message and a Relocation Request message that are transmitted from the source Radio Network Controller to the target Radio Network Controller via the SGSN (Serving GPRS (General Packet Radio Service) Support Node).

In the MBMS service relevant information transfer method of the invention, the relevant information of the MBMS service joined by the radio terminal is transferred using a Relocation Commit message that is transmitted from the source Radio Network Controller to the target Radio Network Controller.

In the MBMS service relevant information transfer method of the invention, the relevant information of the MBMS service joined by the radio terminal is transferred using a Relocation Request message that the SGSN transmits to the target Radio Network Controller.

In the MBMS service relevant information transfer method of the invention, the relevant information of the MBMS service joined by the radio terminal is transferred using another UE Linking message that the SGSN transmits to the target Radio Network Controller after completion of the Relocation procedure.

As described above, with the MBMS service relevant information transfer method of the invention, since the relevant information of the MBMS service joined by the radio terminal is transferred to the target Radio Network Controller during the relocation, the target Radio Network Controller can store it as the MBMS UE Context Info in the UE Context, and associate it with the MBMS UE Context Info in the UE Context, using the MBMS Service ID and the IMSI in the MBMS Service Context.

Also, with the MBMS service relevant information transfer method of the invention, the number of radio terminals joining the MBMS service can be correctly known from the MBMS Service Context, when receiving a Session Start message from the SGSN, whereby it is possible to determine correctly whether the PtP method or PtM method is employed to transfer the contents data of the MBMS service.

Moreover, with the MBMS service relevant information transfer method of the invention, the target Radio Network Controller transmits an MBMS Notification message on the wireless common channel to notify that the contents data of the MBMS service is transferred soon, but if the target Radio Network Controller finds that the radio terminal joins the MBMS service from the MBMS UE Context in the UE Context and finds that the radio terminal is in a state not capable of receiving on the common channel by determining the state of the radio terminal from the UE Context, the target Radio Network Controller transmits the MBMS Notification message on the dedicated channel, to notify that the contents data of the MBMS service is transferred soon.

Moreover, with the MBMS service relevant information transfer method of the invention, if the PtP method is decided, the target Radio Network Controller knows that the radio terminal joins the MBMS service from the MBMS UE Context in the UE Context, and can transfer the contents data of the MBMS service to the radio terminal on the dedicated channel.

Hence, with the MBMS service relevant information transfer method of the invention, the source Radio Network Controller transfers the relevant information of the MBMS service joined by the radio terminal to the target Radio Network Controller in performing the relocation, whereby the target Radio Network Controller can decide correctly the transfer method for the relevant information of the MBMS service, the PtP (Point to Point) method or the PtM (Point to Multipoint) method.

Concurrently, with the MBMS service relevant information transfer method of the invention, the target Radio Network Controller transmits an MBMS Notification message to the radio terminal on the dedicated channel, and can notify that the contents data of the MBMS service starts to be transferred soon.

Also, with the MBMS service relevant information transfer method of the invention, even if the PtP method is decided, the target Radio Network Controller can transfer the contents data of the MBMS service to the radio terminal.

The present invention has the configuration and operation as described in the following, and has the effect that the target Radio Network Controller can decide correctly the PtP method or the PtM method, and notify that the contents data of the MBMS service starts to be transferred to the radio terminal.

BRIEF DESCRIPTION OF THE DRAWINGS

FIG. 11 is a sequence chart showing a control sequence during execution of the relocation procedure.

DETAILED DESCRIPTION OF THE PREFERRED EMBODIMENTS

Figure 1:
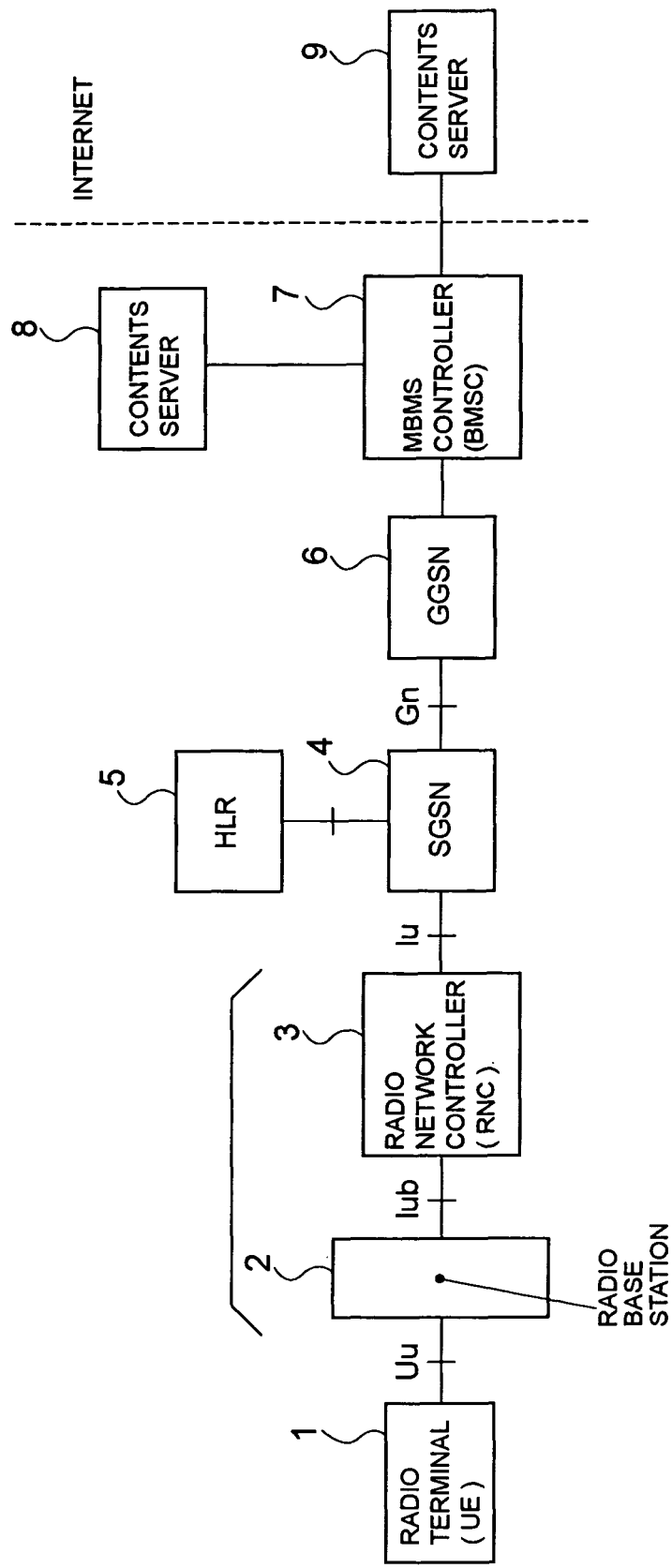
FIG. 1 is a block diagram showing the configuration of a mobile communication system according to a first embodiment of the present invention.

The preferred embodiments of the present invention will be described below with reference to the drawings. FIG. 1 is a block diagram showing the configuration of a mobile communication system according to a first embodiment of the invention. The mobile communication system according to the first embodiment of the invention provides an MBMS (Multimedia Broadcast Multicast Service) service of distributing the same contents data to the radio terminals (UE: User Equipment) existing in a cell.

In FIG. 1, the mobile communication system according to the first embodiment of the invention comprises a radio terminal 1, a radio base station 2, a Radio Network Controller (RNC) 3, an SGSN (Servicing GRPS (General Packet Radio Service) Support Node) 4, an HLR (Home Location Register) 5, a GGSN (Gateway GPRS Support Node) 6, an MBMS controller (BMSC: Broadcast Multicast Service Center) 7, and the contents servers 8, 9. They are well known (e.g., refer to Non-Patent Document 1), and their configuration and operation are not described.

Figure 2:
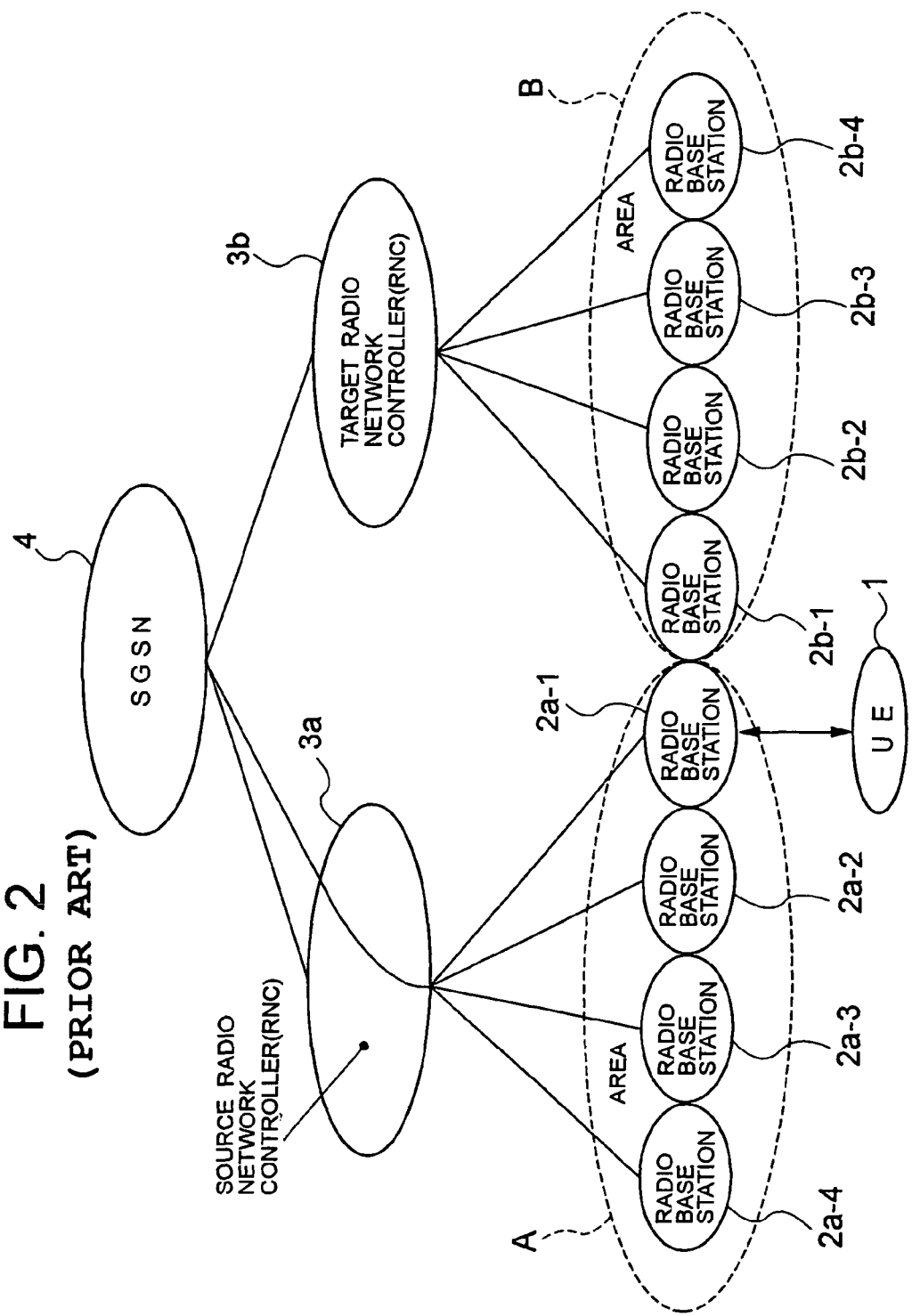
FIG. 2 is a diagram showing a state where the radio terminal of FIG. 1 communicates with the source Radio Network Controller (a state before relocation)
Figure 3:
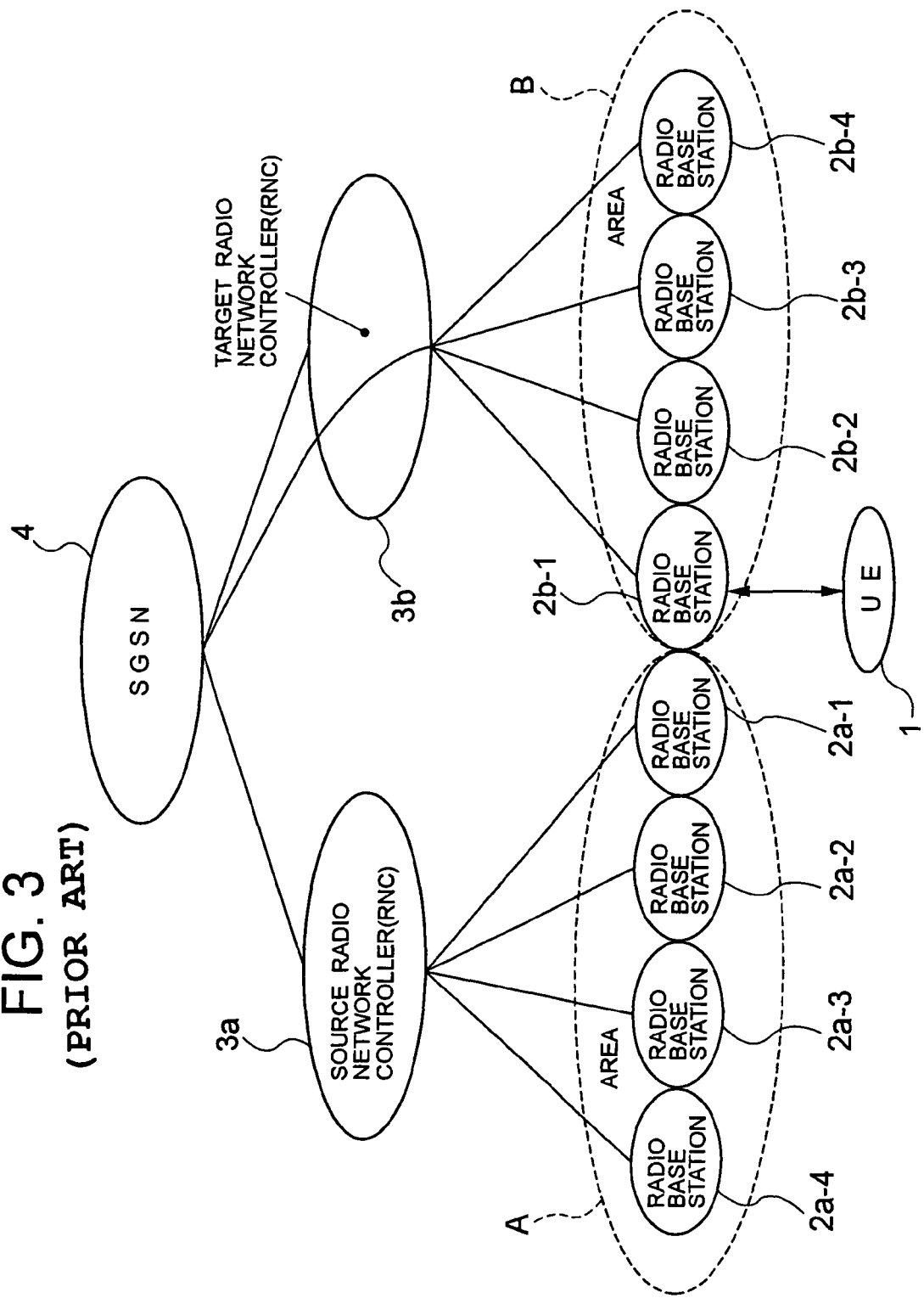
FIG. 3 is a diagram showing a state where the radio terminal of FIG. 1 communicates with the target Radio Network Controller (a state after relocation)

FIG. 2 is a diagram showing a state (before relocation) where the radio terminal 1 of FIG. 1 communicates with the source Radio Network Controller (Source RNC), and FIG. 3 is a diagram showing a state (after relocation) where the radio terminal 1 of FIG. 1 communicates with the target Radio Network Controller (Target RNC).

Figure 4:
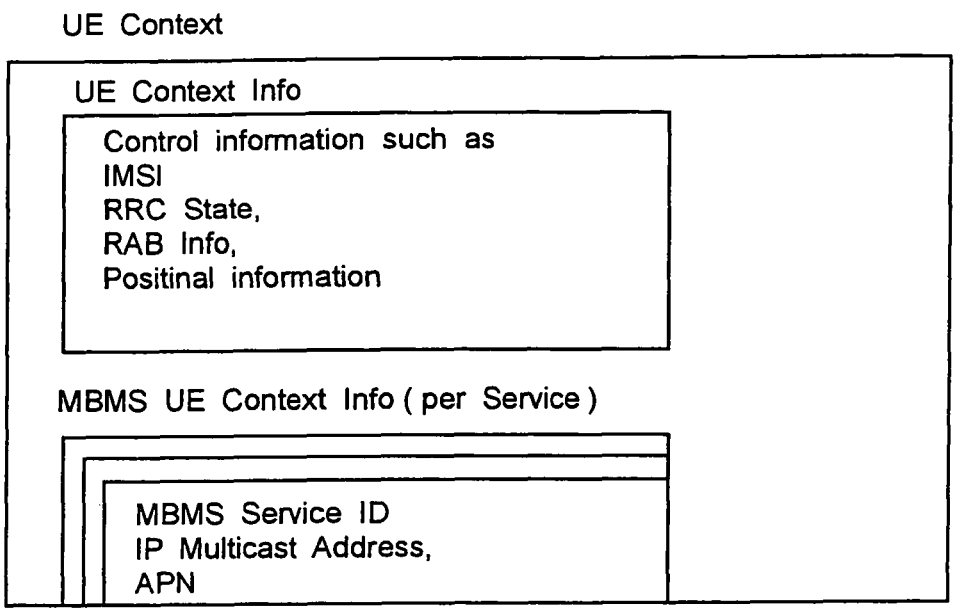
FIG. 4 is a list showing a UE Context in the Radio Network Controller of FIG. 1.
Figure 5:
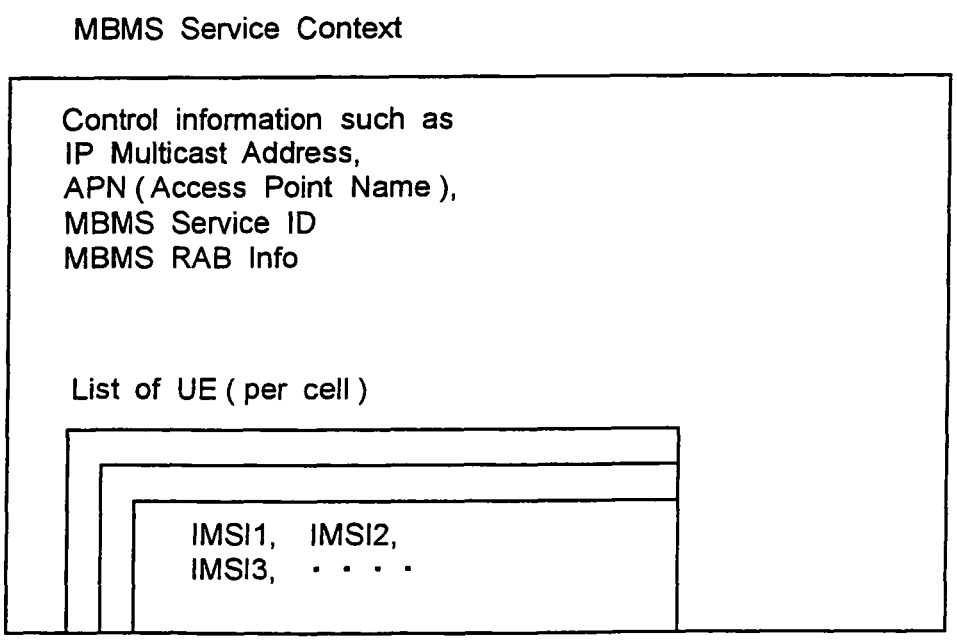
FIG. 5 is a list showing an MBMS Service Context in the Radio Network Controller of FIG. 1.

FIG. 4 is a list showing the UE Context in the Radio Network Controller 3 of FIG. 1, and FIG. 5 is a list showing the MBMS Service Context in the Radio Network Controller 3 of FIG. 1. Referring to FIGS. 1 to 5, an MBMS control process for the Radio Network Controller 3 will be described below.

The context information as shown in FIGS. 4 and 5 is stored in a memory (not shown) of the Radio Network Controller 3. The context information of FIG. 4 is called "UE Context", and the context information of FIG. 5 is called "MBMS Service Context".

In the "UE Context" of FIG. 4 the information for the Radio Network Controller 3 to control the radio terminal 1, when the radio terminal 1 performs the normal communication (voice communication or packet communication), including the IMSI (International Mobile Subscriber Identity: fixed identifier for radio terminal), RRC (Radio Resource Control) State, RAB (Radio Access Bearer) Info, and positional information (cell information in which the radio terminal 1 is located), is stored. This "UE Context" is generated by the Radio Network Controller 3, when the radio terminal 1 starts to perform the normal communication (voice communication or packet communication) with the network (not shown).

The "MBMS Service Context" of FIG. 5 exists for each MBMS service, and in the "MBMS Service Context" the information for the Radio Network Controller 3 to control the MBMS service, including the IP (Internet Protocol) Multicast Address (IP address of a server sending out the contents data of MBMS service), APN (Access Point Name: GGSN6), MBMS service ID (MBMS service identifier), MBMS RAB Info (RAB information for transferring the contents data of MBMS service, and so forth) and the IMSI of the radio terminal 1 having joined the MBMS service, is stored for each cell.

Figure 10:
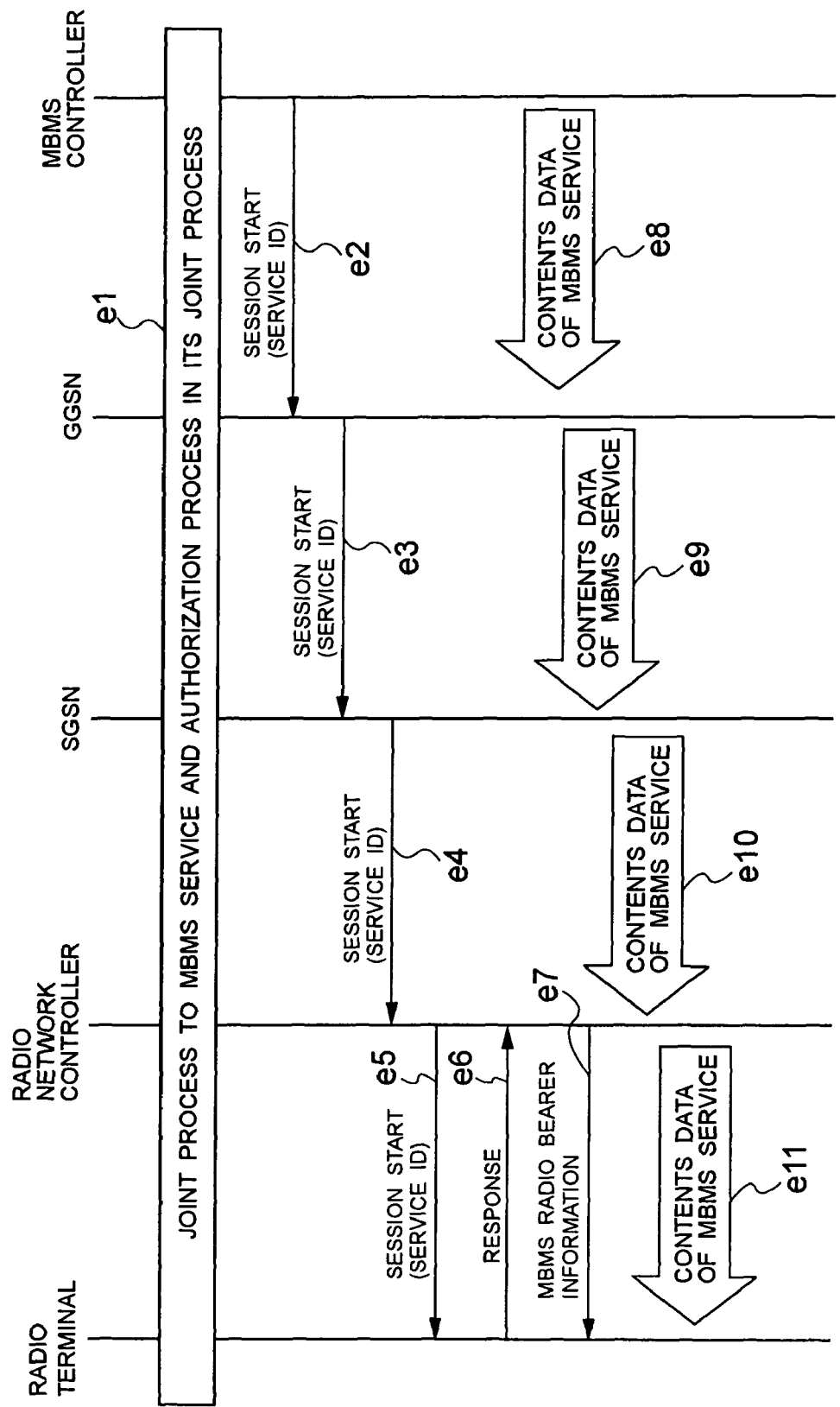
FIG. 10 is a sequence chart showing a control sequence in the MBMS.

The Radio Network Controller 3 generates this "MBMS Service Context" when receiving a Session Start Message from the SGSN 4 (see e1 to e11 in FIG. 10). Besides, the Radio Network Controller 3 generates the "MBMS Service Context" when starting the normal communication (voice communication or packet communication) after the radio terminal 1 joins the MBMS service. At this time, the Radio Network Controller 3 also generates the "MBMS UE Context Info" as shown in FIG. 4 and stores it in the "UE Context".

If the Radio Network Controller 3 generates the "MBMS Service Context" when starting the normal communication (voice communication or packet communication) after the radio terminal 1 joins the MBMS service, it can know the number of radio terminals joining the MBMS service at the time of receiving a Session Start message from the SGSN4, and determine whether the contents data of MBMS service is transferred with the PtP method or PtM method.

After receiving the Session Start message, the Radio Network Controller 3 transmits an MBMS Notification message on the wireless common channel to notify that the contents data of MBMS service starts to be transferred soon.

Also, the radio terminal 1 may not receive the MBMS Notification message transmitted on the wireless common channel, depending on its state. For example, while the radio terminal 1 is communicating on the dedicated channel, it is unreceivable on the wireless common channel. In this case, the Radio Network Controller 3 refers to the RRC State in the "UE Context" of FIG. 4, and if the radio terminal 1 is in a state not capable of receiving the MBMS Notification message on the wireless common channel (e.g., state where it is communicating on the dedicated channel), the Radio Network Controller 3 transmits the MBMS Notification message on the dedicated channel to the radio terminal 1 and notifies that the contents data of MBMS service is transferred soon.

The Radio Network Controller 3a managing the radio terminal 1 in communication with the network is referred to as a serving Radio Network Controller (Serving RNC) to manage the movement of the radio terminal 1 with the "UE Context".

When the radio terminal 1 moves from an area A of the Serving RNC (Radio Network Controller 3a) to an area B of the Radio Network Controller 3b adjacent to it, the Serving Radio Network Controller performs the Relocation to pass a management right of the radio terminal 1 to the Radio Network Controller 3b of movement destination for the line utilization efficiency.

The serving Radio Network Controller becomes the Radio Network Controller of relocation source during execution of a relocation procedure. This Radio Network Controller 3a of relocation source is referred to as a source Radio Network Controller (Source RNC), and the Radio Network Controller 3b of relocation destination is referred to as a target Radio Network Controller (Target RNC).

When the relocation is performed, according to the conventional system specifications, the relevant information ("MBMS UE Context Info" in FIG. 4) of an MBMS service joined by the radio terminal 1 is not notified from the source Radio Network Controller 3a to the target Radio Network Controller 3b of relocation destination, though the radio terminal 1 joins a certain MBMS service.

In FIGS. 2 and 3, the radio base stations 2a-1 to 2a-4 are disposed in an area A of the Radio Network Controller 3a of relocation source, and the radio base stations 2b-1 to 2b-4 are disposed in an area B of the Radio Network Controller 3b of relocation destination.

Figure 6:
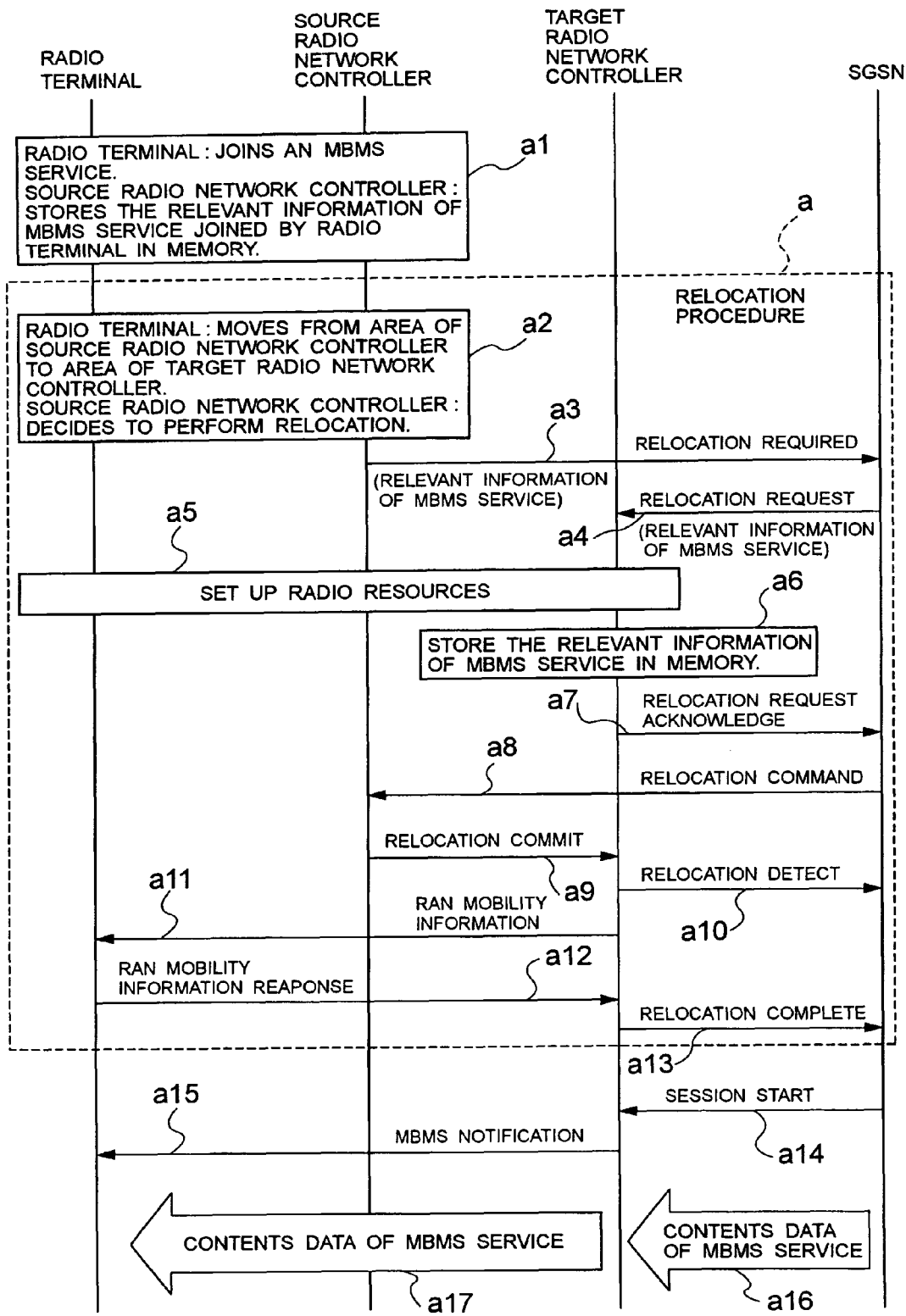
FIG. 6 is a sequence chart showing an operation for transferring the MBMS service relevant information in a relocation procedure according to a first embodiment of the invention.

FIG. 6 is a sequence chart showing an operation for transferring the relevant information of MBMS service in the relocation procedure according to the first embodiment of the invention. Referring to FIGS. 1 to 6, the operation for transferring the relevant information of MBMS service during the relocation procedure according to the first embodiment of the invention will be described below.

If the radio terminal 1 joins an MBMS service while communicating with the network through the source Radio Network Controller 3a (see FIG. 2), the source Radio Network Controller 3a stores the relevant information of the MBMS service joined by the radio terminal 1 in the memory (a1 in FIG. 6). When the radio terminal 1 joins the MBMS service, it joins the MBMS controller 7 of FIG. 1.

If the radio terminal 1 moves from the area A of the source Radio Network Controller 3a to the area B of the target Radio Network Controller 3b, the source Radio Network Controller 3a decides to perform the relocation procedure a (a2 in FIG. 6).

The source Radio Network Controller 3a sets up the relevant information (e.g., MBMS service ID, IP Multicast Address, APN) of the MBMS service joined by the radio terminal 1 in a Relocation Required message, and transmits it to the SGSN4 (a3 in FIG. 6). The relevant information of the MBMS service is not interpreted by the SGSN4, and simply set to be transparent. Or the relevant information of the MBMS service may be interpreted by the SGSN4.

If receiving the Relocation Required message, the SGSN4 transmits a Relocation Request message to the target Radio Network Controller 3b (a4 in FIG. 6). At this time, the SGSN4 does not interpret the relevant information of the MBMS service set up by the source Radio Network Controller 3a (relevant information of the MBMS service joined by the radio terminal 1), and directly transfers it with the Relocation Request message. Or the SGSN4 may interpret the relevant information of the MBMS service set up by the source Radio Network Controller 3a, and transfer the relevant information of the MBMS service extracted from the Relocation Required message with the Relocation Request message.

The target Radio Network Controller 3b sets up the radio resources for enabling the communication with the radio terminal 1 (a5 in FIG. 6). The target Radio Network Controller 3b stores the relevant information of the MBMS service in the Relocation Required message (relevant information of the MBMS service joined by the radio terminal 1) in the memory (a6 in FIG. 6).

Specifically, the MBMS UE Context Info is created at the same time when the UE Context is generated (FIG. 4), and the relevant information of MBMS service joined by the radio terminal 1 is stored. The relevant information of MBMS service includes the MBMS service ID, IP Multicast Address and APN, and so forth. Also, the MBMS Service Context corresponding to the MBMS service is generated if it does not exist, and the MBMS Service ID, IP Multicast Address, APN, MBMS RAB Info and the IMSI of the radio terminal 1 having joined the MBMS service are stored for each cell.

The target Radio Network Controller 3b transmits a Relocation Request Acknowledge message to the SGSN4 (a7 in FIG. 6). The SGSN4 transmits a Relocation Command message to the source Radio Network Controller 3a (a8 in FIG. 6).

If receiving the Relocation Command message, the source Radio Network Controller 3a transmits a Relocation Commit message to the target Radio Network Controller 3b (a9 in FIG. 6). If receiving the Relocation Commit message, the target Radio Network Controller 3b transmits a Relocation Detect message to the SGSN4 (a10 in FIG. 6), and transmits a RAN Mobility Information message to the radio terminal 1 (a11 in FIG. 6).

If receiving the RAN Mobility Information message, the radio terminal 1 transmits a RAN Mobility Information Response message to the target Radio Network Controller 3b (a12 in FIG. 6).

If receiving the RAN Mobility Information Response message, the target Radio Network Controller 3b transmits a Relocation Complete message to the SGSN4 (a13 in FIG. 6). Thus, the relocation procedure a is completed.

Thereafter, when a Session Start message signifying the start of transmitting the contents data of MBMS service is transmitted from the SGSN4 (a14 in FIG. 6), the target Radio Network Controller 3b usually finds the number of radio terminals having joined the MBMS service from a radio terminal list for each cell in the MBMS Context stored in the memory, and determines whether the contents data of MBMS service is transferred with the PtP method or PtM method.

The target Radio Network Controller 3b transmits an MBMS Notification message on the wireless common channel to notify that the contents data of MBMS service is transferred soon (a15 in FIG. 6).

Moreover, the target Radio Network Controller 3b retrieves the UE Context stored in the memory, employing the IMSI of the radio terminal list for each cell in the MBMS Service Context stored in the memory, and recognizes that the radio terminal 1 has joined the MBMS service from the MBMS UE Context Info in the UE Context. If it is determined that the radio terminal is unreceivable on the wireless common channel from the state of the radio terminal 1 at that time, the target Radio Network Controller 3b transmits the MBMS Notification message on the dedicated channel to notify that the contents data of MBMS service starts to be transferred soon.

If the number of radio terminals responding to the MBMS Notification message transmitted on the wireless common channel is not beyond the threshold, and the transfer conditions with the PtM method are not satisfied, the target Radio Network Controller 3b transfers the contents data of MBMS service with the PtP method (a16, a17 in FIG. 6).

In this embodiment, the target Radio Network Controller 3b transfers the contents data of MBMS service with the PtP method, and recognizes that the radio terminal 1 has joined the MBMS service from the MBMS UE Context in the UE Context stored in the memory, whereby the target Radio Network Controller 3b can transfer the contents data of MBMS service to the radio terminal 1 on the dedicated channel.

Figure 7:
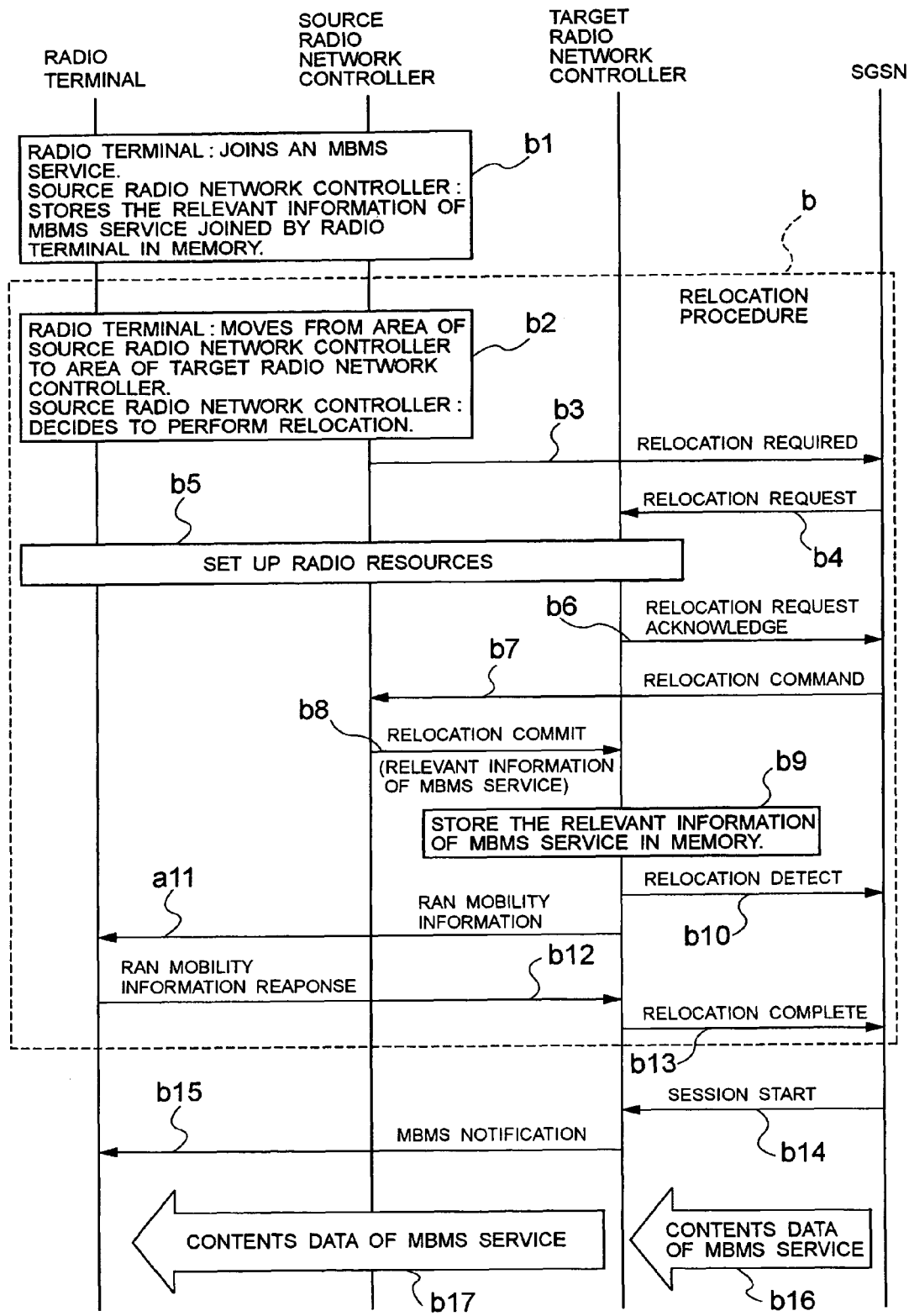
FIG. 7 is a sequence chart showing an operation for transferring the MBMS service relevant information in a relocation procedure according to a second embodiment of the invention.

FIG. 7 is a sequence chart showing an operation for transferring the relevant information of MBMS service in a relocation procedure according to a second embodiment of the invention. A mobile communication system according to the second embodiment of the invention has the same configuration and operation as the mobile communication system according to the first embodiment as shown in FIG. 1, except for the operation for transferring the relevant information of MBMS service. Referring to FIGS. 1 to 5 and FIG. 7, the operation for transferring the relevant information of MBMS service during the relocation procedure according to the second embodiment of the invention will be described below.

In this embodiment, the source Radio Network Controller 3a sets up the relevant information of MBMS service joined by the radio terminal 1 in the Relocation Commit message transmitted directly to the target Radio Network Controller 3b, as shown in FIG. 7, although in the first embodiment the source Radio Network Controller 3a sets up the relevant information of MBMS service joined by the radio terminal 1 in the Relocation Required message via the SGSN4, as shown in FIG. 6.

If the radio terminal 1 joins an MBMS service while communicating with the network through the source Radio Network Controller 3*a* (see FIG. 2), the source Radio Network Controller 3*a* stores the relevant information of the MBMS service joined by the radio terminal 1 in the memory (b1 in FIG. 7). When the radio terminal 1 joins the MBMS service, it joins the MBMS controller 7 of FIG. 1.

If the radio terminal 1 moves from an area A of the source Radio Network Controller 3*a* to an area B of the target Radio Network Controller 3*b*, the source Radio Network Controller 3*a* decides to perform the relocation procedure b (b2 in FIG. 7).

The source Radio Network Controller 3*a* transmits a Relocation Required message to the SGSN4 (b3 in FIG. 7). If receiving the Relocation Required message, the SGSN4 transmits a Relocation Request message to the target Radio Network Controller 3*b* (b4 in FIG. 7).

The target Radio Network Controller 3*b* sets up the radio resources for enabling the communication with the radio terminal 1 (b5 in FIG. 7), and transmits a Relocation Request Acknowledge message to the SGSN4 (b6 in FIG. 7). The SGSN4 transmits a Relocation Command message to the source Radio Network Controller 3*a* (b7 in FIG. 7).

If receiving the Relocation Command message, the source Radio Network Controller 3*a* sets up the relevant information of MBMS service (MBMS service ID, IP Multicast Address, and so forth) joined by the radio terminal 1 in a Relocation Commit message, and transmits it to the target Radio Network Controller 3*b* (b8 in FIG. 7).

If receiving the Relocation Commit message, the target Radio Network Controller 3*b* stores the relevant information of MBMS service in the Relocation Commit message (relevant information of MBMS service joined by the radio terminal 1) in the memory (b9 in FIG. 7).

Specifically, the MBMS UE Context Info is created at the same time when the UE Context is generated (FIG. 4), and the relevant information of MBMS service joined by the radio terminal 1 is stored. The relevant information of MBMS service includes the MBMS service ID, IP Multicast Address and APN, and so forth. Also, the MBMS Service Context corresponding to the MBMS service is generated if it does not exist, and the MBMS Service ID, IP Multicast Address, APN, MBMS RAB Info and the IMSI of the radio terminal 1 having joined the MBMS service are stored for each cell.

Also, the target Radio Network Controller 3*b* transmits a Relocation Detect message to the SGSN4 (b10 in FIG. 7), and transmits a RAN Mobility Information message to the radio terminal 1 (b11 in FIG. 7).

If receiving the RAN Mobility Information message, the radio terminal 1 transmits a RAN Mobility Information Response message to the target Radio Network Controller 3*b* (b12 in FIG. 7).

If receiving the RAN Mobility Information Response message, the target Radio Network Controller 3*b* transmits a Relocation Complete message to the SGSN4 (b13 in FIG. 7). Thus, the relocation procedure b is completed.

Thereafter, when a Session Start message signifying the start of transmitting the contents data of MBMS service is transmitted from the SGSN4 (b14 in FIG. 7), the target Radio Network Controller 3*b* usually finds the number of radio terminals having joined the MBMS service from a radio terminal list for each cell in the MBMS Context stored in the memory, and determines whether the contents data of MBMS service is transferred with the PtP method or PtM method.

The target Radio Network Controller 3*b* transmits an MBMS Notification message on the wireless common channel to notify that the contents data of MBMS service is transferred soon (b15 in FIG. 7).

Moreover, the target Radio Network Controller 3*b* retrieves the UE Context stored in the memory, employing the IMSI of the radio terminal list for each cell in the MBMS Service Context stored in the memory, and recognizes that the radio terminal 1 has joined the MBMS service from the MBMS UE Context Info in the UE Context. If it is determined that the radio terminal is unreceivable on the wireless common channel from the state of the radio terminal 1 at that time, the target Radio Network Controller 3*b* transmits the MBMS Notification message on the dedicated channel to notify that the contents data of MBMS service starts to be transferred soon.

If the number of radio terminals responding to the MBMS Notification message transmitted on the wireless common channel is not beyond the threshold, and the transfer conditions with the PtM method are not satisfied, the target Radio Network Controller 3*b* transfers the contents data of MBMS service with the PtP method (b16, b17 in FIG. 7).

In this embodiment, the target Radio Network Controller 3*b* transfers the contents data of MBMS service with the PtP method, and recognizes that the radio terminal 1 has joined the MBMS service from the MBMS UE Context in the UE Context stored in the memory, whereby the target Radio Network Controller 3*b* can transfer the contents data of MBMS service to the radio terminal 1 on the dedicated channel.

Figure 8:
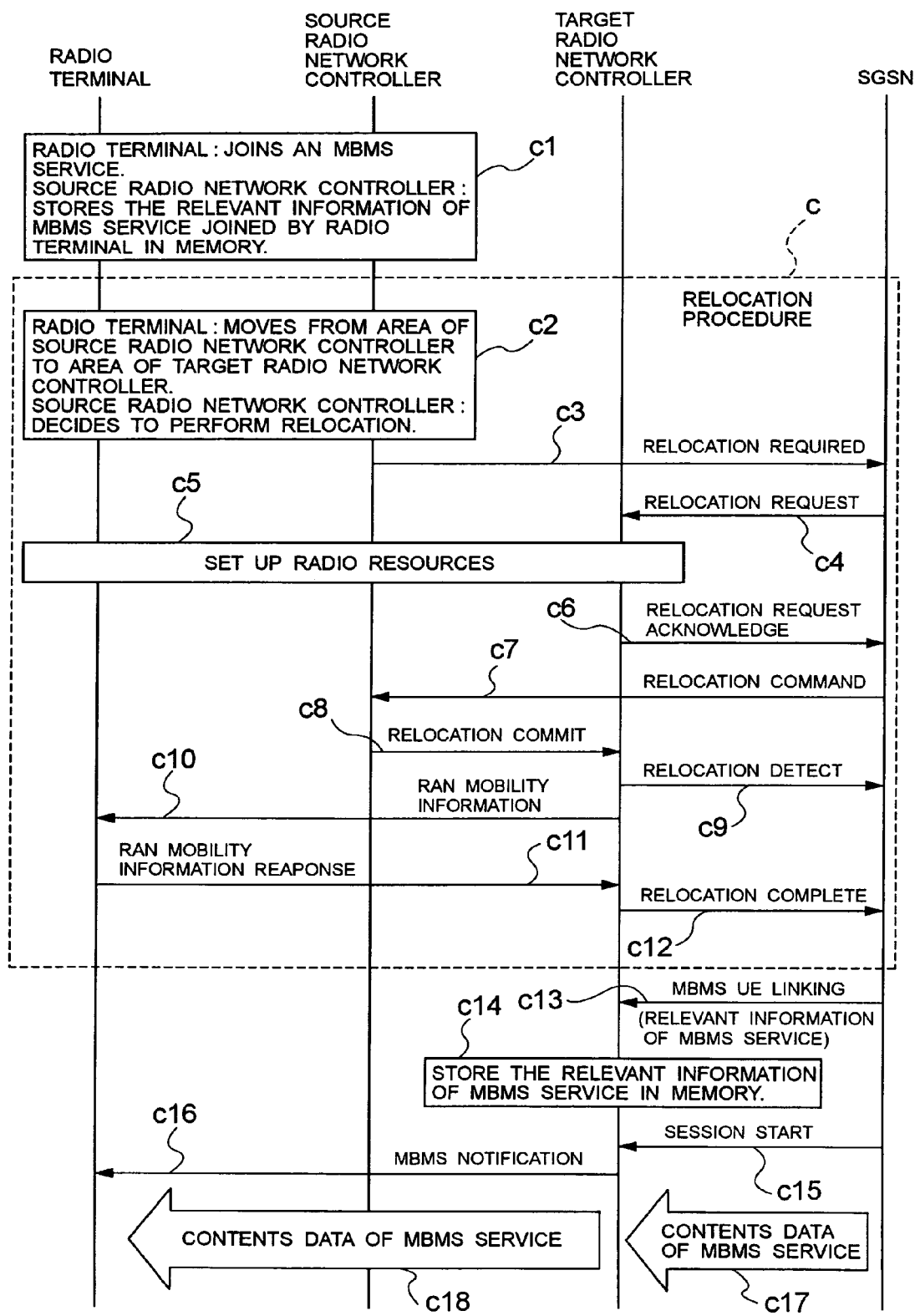
FIG. 8 is a sequence chart showing an operation for transferring the MBMS service relevant information in a relocation procedure according to a third embodiment of the invention.

FIG. 8 is a sequence chart showing an operation for transferring the relevant information of MBMS service in a relocation procedure according to a third embodiment of the invention. A mobile communication system according to the third embodiment of the invention has the same configuration and operation as the mobile communication system according to the first embodiment as shown in FIG. 1, except for the operation for transferring the relevant information of MBMS service. Referring to FIGS. 1 to 5 and FIG. 8, the operation for transferring the relevant information of MBMS service during the relocation procedure according to the third embodiment of the invention will be described below.

In this embodiment, the SGSN4 transmits an MBMS UE Linking message including the relevant information of MBMS service joined by the radio terminal 1 to the target Radio Network Controller 3*b*, after the relocation procedure c is ended, as shown in FIG. 8, although in the first embodiment the source Radio Network Controller 3*a* sets up the relevant information of MBMS service joined by the radio terminal 1 in the Relocation Required message via the SGSN4, as shown in FIG. 6. The relevant information of MBMS service joined by the radio terminal 1 is acquired in advance by the SGSN4.

If the radio terminal 1 joins an MBMS service while communicating with the network through the source Radio Network Controller 3*a* (see FIG. 2), the source Radio Network Controller 3*a* stores the relevant information of the MBMS service joined by the radio terminal 1 in the memory (c1 in FIG. 8). When the radio terminal 1 joins the MBMS service, it joins the MBMS controller 7 of FIG. 1.

If the radio terminal 1 moves from an area A of the source Radio Network Controller 3*a* to an area B of the target Radio Network Controller 3*b*, the source Radio Network Controller 3*a* decides to perform the relocation procedure c (c2 in FIG. 8).

The source Radio Network Controller 3*a* transmits a Relocation Required message to the SGSN4 (c3 in FIG. 8). If receiving the Relocation Required message, the SGSN4 transmits a Relocation Request message to the target Radio Network Controller 3*b* (c4 in FIG. 8).

The target Radio Network Controller 3*b* sets up the radio resources for enabling the communication with the radio terminal 1 (c5 in FIG. 8), and transmits a Relocation Request Acknowledge message to the SGSN4 (c6 in FIG. 8). The SGSN4 transmits a Relocation Command message to the source Radio Network Controller 3*a* (c7 in FIG. 8).

If receiving the Relocation Command message, the source Radio Network Controller 3*a* transmits a Relocation Commit message to the target Radio Network Controller 3*b* (c8 in FIG. 8). If receiving the Relocation Commit message, the target Radio Network Controller 3*b* transmits a Relocation Detect message to the SGSN4 (c9 in FIG. 8), and transmits a RAN Mobility Information message to the radio terminal 1 (c10 in FIG. 8).

If receiving the RAN Mobility Information message, the radio terminal 1 transmits a RAN Mobility Information Response message to the target Radio Network Controller 3*b* (c11 in FIG. 8).

If receiving the RAN Mobility Information Response message, the target Radio Network Controller 3*b* transmits a Relocation Complete message to the SGSN4 (c12 in FIG. 8). Thus, the relocation procedure c is completed.

After this relocation procedure c is completed, the SGSN4 transmits an MBMS UE Linking message to the target Radio Network Controller 3*b*, in which the MBMS UE Linking message includes the relevant information (MBMS service ID, IP Multicast Address, and so forth) of the MBMS service joined by the radio terminal 1 (c13 in FIG. 8).

If receiving the MBMS UE Linking message from the SGSN4, the target Radio Network Controller 3*b* stores the relevant information of the MBMS service in the MBMS UE Linking message (i.e., relevant information of the MBMS service joined by the radio terminal 1) in the memory (c14 in FIG. 8).

Specifically, the MBMS UE Context Info is created at the same time when the UE Context is generated (FIG. 4), and the relevant information of MBMS service joined by the radio terminal 1 is stored. The relevant information of MBMS service includes the MBMS service ID, IP Multicast Address and APN, and so forth. Also, the MBMS Service Context corresponding to the MBMS service is generated if it does not exist, and the MBMS Service ID, IP Multicast Address, APN, MBMS RAB Info and the IMSI of the radio terminal 1 having joined the MBMS service are stored for each cell.

Thereafter, when a Session Start message signifying the start of transmitting the contents data of MBMS service is transmitted from the SGSN4 (c15 in FIG. 8), the target Radio Network Controller 3*b* usually finds the number of radio terminals having joined the MBMS service from a radio terminal list for each cell in the MBMS Context stored in the memory, and determines whether the contents data of MBMS service is transferred with the PtP method or PtM method.

The target Radio Network Controller 3*b* transmits an MBMS Notification message on the wireless common channel to notify that the contents data of MBMS service is transferred soon (c16 in FIG. 8).

Moreover, the target Radio Network Controller 3*b* retrieves the UE Context stored in the memory, employing the IMSI of the radio terminal list for each cell in the MBMS Service Context stored in the memory, and recognizes that the radio terminal 1 has joined the MBMS service from the MBMS UE Context Info in the UE Context. If it is determined that the radio terminal is unreceivable on the wireless common channel from the state of the radio terminal 1 at that time, the target Radio Network Controller 3*b* transmits the MBMS Notification message on the dedicated channel to notify that the contents data of MBMS service starts to be transferred soon.

If the number of radio terminals responding to the MBMS Notification message transmitted on the wireless common channel is not beyond the threshold, and the transfer conditions with the PtM method are not satisfied, the target Radio Network Controller 3*b* transfers the contents data of MBMS service with the PtP method (c17, c18 in FIG. 8).

In this embodiment, the target Radio Network Controller 3*b* transfers the contents data of MBMS service with the PtP method, and recognizes that the radio terminal 1 has joined the MBMS service from the MBMS UE Context in the UE Context stored in the memory, whereby the target Radio Network Controller 3*b* can transfer the contents data of MBMS service to the radio terminal 1 on the dedicated channel.

Figure 9:
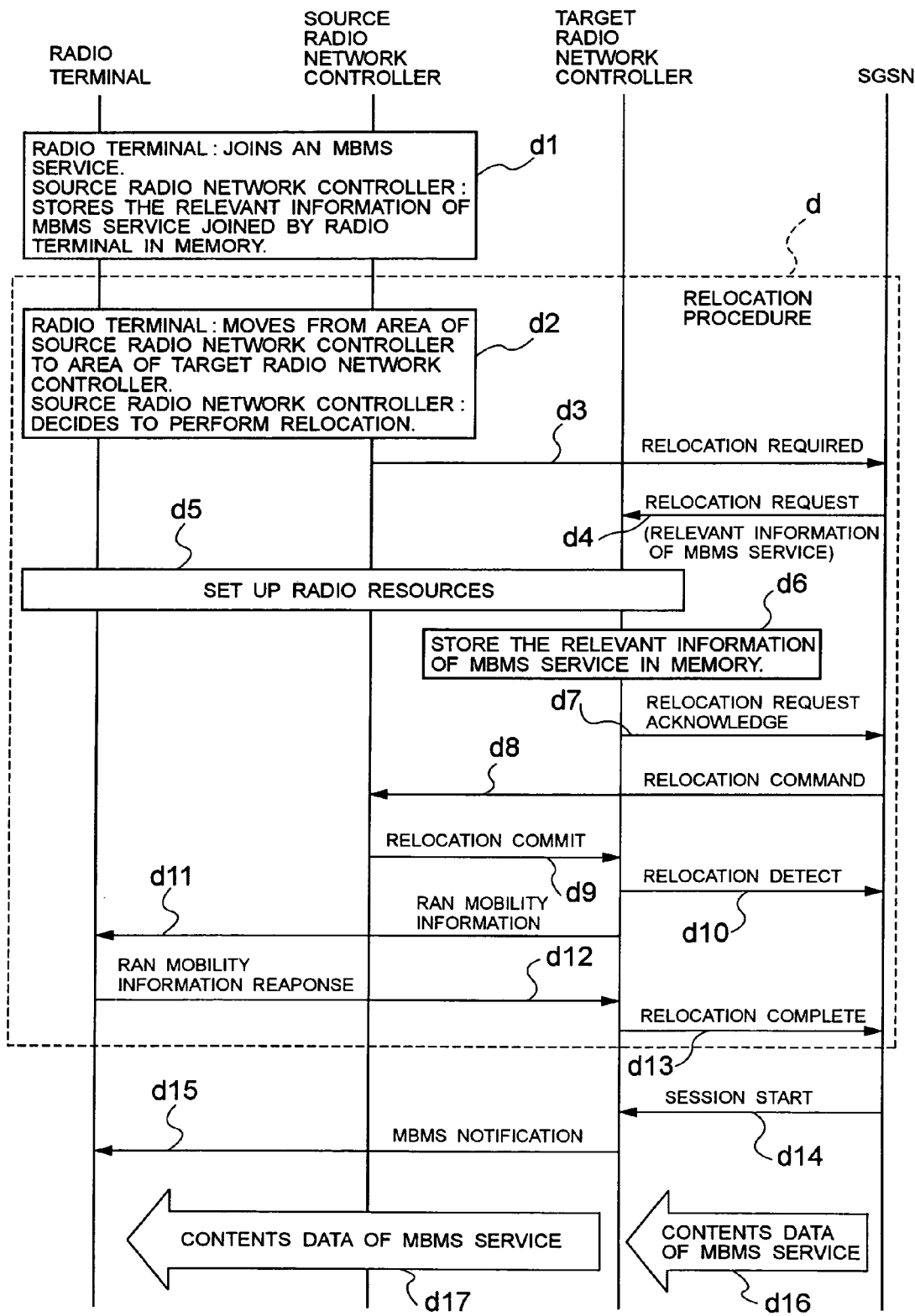
FIG. 9 is a sequence chart showing an operation for transferring the MBMS service relevant information in a relocation procedure according to a fourth embodiment of the invention.

FIG. 9 is a sequence chart showing an operation for transferring the relevant information of MBMS service in a relocation procedure according to a fourth embodiment of the invention. A mobile communication system according to the fourth embodiment of the invention has the same configuration and operation as the mobile communication system according to the first embodiment as shown in FIG. 1, except for the operation for transferring the relevant information of MBMS service. Referring to FIGS. 1 to 5 and FIG. 9, the operation for transferring the relevant information of MBMS service during the relocation procedure according to the fourth embodiment of the invention will be described below.

In this embodiment, the SGSN4 sets up the relevant information of MBMS service joined by the radio terminal 1, when the SGSN4 transmits a Relocation Request message to the target Radio Network Controller 3*b*, as shown in FIG. 9, although in the first embodiment the source Radio Network Controller 3*a* sets up the relevant information of MBMS service joined by the radio terminal 1 in the Relocation Required message via the SGSN4, as shown in FIG. 6. The relevant information of MBMS service joined by the radio terminal 1 is acquired in advance by the SGSN4.

If the radio terminal 1 joins an MBMS service while communicating with the network through the source Radio Network Controller 3*a* (see FIG. 2), the source Radio Network Controller 3*a* stores the relevant information of the MBMS service joined by the radio terminal 1 in the memory (d1 in FIG. 9). When the radio terminal 1 joins the MBMS service, it joins the MBMS controller 7 of FIG. 1.

If the radio terminal 1 moves from an area A of the source Radio Network Controller 3*a* to an area B of the target Radio Network Controller 3*b*, the source Radio Network Controller 3*a* decides to perform the relocation procedure d (d2 in FIG. 9).

The source Radio Network Controller 3*a* transmits a Relocation Required message to the SGSN4 (d3 in FIG. 9). If receiving the Relocation Required message, the SGSN4 sets up the relevant information (MBMS service ID, IP Multicast Address, and so forth) of the MBMS service joined by the radio terminal 1 in a Relocation Request message, and transmits it to the target Radio Network Controller 3*b* (d4 in FIG. 9).

The target Radio Network Controller 3*b* sets up the radio resources for enabling the communication with the radio terminal 1 (d5 in FIG. 9), and stores the relevant information of the MBMS service in the Relocation Request message (relevant information of the MBMS service joined by the radio terminal 1) in the memory (d6 in FIG. 9).

Specifically, the MBMS UE Context Info is created at the same time when the UE Context is generated (FIG. 4), and the relevant information of MBMS service joined by the radio terminal 1 is stored. The relevant information of MBMS service includes the MBMS service ID, IP Multicast Address and APN, and so forth. Also, the MBMS Service Context corresponding to the MBMS service is generated if it does not exist, and the MBMS Service ID, IP Multicast Address, APN, MBMS RAB Info and the IMSI of the radio terminal 1 having joined the MBMS service are stored for each cell.

The target Radio Network Controller 3b transmits a Relocation Request Acknowledge message to the SGSN4 (d7 in FIG. 9). The SGSN4 transmits a Relocation Command message to the source Radio Network Controller 3a (d8 in FIG. 9).

If receiving the Relocation Command message, the source Radio Network Controller 3a transmits a Relocation Commit message to the target Radio Network Controller 3b (d9 in FIG. 9). If receiving the Relocation Commit message, the target Radio Network Controller 3b transmits a Relocation Detect message to the SGSN4 (d10 in FIG. 9), and transmits a RAN Mobility Information message to the radio terminal 1 (d11 in FIG. 9).

If receiving the RAN Mobility Information message, the radio terminal 1 transmits a RAN Mobility Information Response message to the target Radio Network Controller 3b (d12 in FIG. 9).

If receiving the RAN Mobility Information Response message, the target Radio Network Controller 3b transmits a Relocation Complete message to the SGSN4 (d13 in FIG. 9). Thus, the relocation procedure d is completed.

Thereafter, when a Session Start message signifying the start of transmitting the contents data of MBMS service is transmitted from the SGSN4 (d14 in FIG. 9), the target Radio Network Controller 3b usually finds the number of radio terminals having joined the MBMS service from a radio terminal list for each cell in the MBMS Context stored in the memory, and determines whether the contents data of MBMS service is transferred with the PtP method or PtM method.

The target Radio Network Controller 3b transmits an MBMS Notification message on the wireless common channel to notify that the contents data of MBMS service is transferred soon (d15 in FIG. 9).

Moreover, the target Radio Network Controller 3b retrieves the UE Context stored in the memory, employing the IMSI of the radio terminal list for each cell in the MBMS Service Context stored in the memory, and recognizes that the radio terminal 1 has joined the MBMS service from the MBMS UE Context Info in the UE Context. If it is determined that the radio terminal is unreceivable on the wireless common channel from the state of the radio terminal 1 at that time, the target Radio Network Controller 3b transmits the MBMS Notification message on the dedicated channel to notify that the contents data of MBMS service starts to be transferred soon.

If the number of radio terminals responding to the MBMS Notification message transmitted on the wireless common channel is not beyond the threshold, and the transfer conditions with the PtM method are not satisfied, the target Radio Network Controller 3b transfers the contents data of MBMS service with the PtP method (d16, d17 in FIG. 9).

In this embodiment, the target Radio Network Controller 3b transfers the contents data of MBMS service with the PtP method, and recognizes that the radio terminal 1 has joined the MBMS service from the MBMS UE Context in the UE Context stored in the memory, whereby the target Radio Network Controller 3b can transfer the contents data of MBMS service to the radio terminal 1 on the dedicated channel.

In this way, with this invention, when the source Radio Network Controller 3a performs the relocation, the relevant information of the MBMS service joined by the radio terminal 1 is transferred to the target Radio Network Controller 3b, whereby the target Radio Network Controller 3b can not only decide the PtP method or the PtM method correctly, but also transmit the MBMS Notification message to the radio terminal 1 on the dedicated channel to notify that the contents data of MBMS service starts to be transferred soon. Also, the target Radio Network Controller 3b can transfer the contents data of MBMS service to the radio terminal 1, even when it decides the PtP method.

The reason is that because the relevant information of MBMS service joined by the radio terminal 1 is transferred to the target Radio Network Controller 3b during the relocation, the target Radio Network Controller 3b can store it as the MBMS UE Context in the UE Context, and later when receiving the Session Start message from the SGSN4, correctly know the number of radio terminals having joined the MBMS service from the MBMS Service Context, and determine whether the contents data of MBMS service is transferred with the PtP method or the PtM method correctly.

Although the target Radio Network Controller 3b transmits the MBMS Notification message on the wireless common channel to notify that the contents data of MBMS service is transferred soon, the target Radio Network Controller knows that the radio terminal 1 has joined the MBMS service from the MBMS UE Context in the UE Context, and if the radio terminal 1 is unreceivable on the wireless common channel due to the state of the radio terminal 1 from the UE Context, it transmits the MBMS Notification message on the dedicated channel to notify that the contents data of MBMS service starts to be transferred soon.

Moreover, if the PtP method is decided, the target Radio Network Controller 3b knows that the radio terminal 1 has joined the MBMS service from the MBMS UE Context in the UE Context, and transmits the contents data of MBMS service to the radio terminal 1 on the dedicated channel.

What is claimed is:

1. A mobile communications system, comprising:
   a plurality of radio terminals;
   a first radio network controller;
   a second radio network controller; and
   a network that connects said first radio network controller and said second radio network controller, the network including an SGSN (Service GPRS (General Packet Radio Service) Support Node),
   wherein during a relocation for one of the plurality of radio terminals from said first radio network controller to said second radio network controller, said first radio network controller transfers information of an MBMS (Multimedia Broadcast Multicast Service) to said second radio network controller via said SGSN, and
   wherein said information is transferred by a Relocation Required message and a Relocation Request message, said information indicating that said one of the radio terminals has joined the MBMS is transparent to said SGSN.

2. The mobile communications system according to claim 1, wherein the transferring of information of said service for said one of the radio terminals occurs when starting said relocation from said first radio network controller to said second radio network controller.

3. The mobile communications system according to claim 2, wherein said information is transferred from said first radio network controller to said second radio network controller via said network.

4. The mobile communications system according to claim 1, wherein the transferring of information of said service for said one of the radio terminals occurs during said relocation from said first radio network controller to said second radio network controller.

5. The mobile communications system according to claim 4, wherein said information is transferred from said first radio network controller to said second radio network controller by said first radio network controller by using a Relocation Commit message.

6. The mobile communications system according to claim 1, wherein the transferring of information of said service for said one of the radio terminals occurs when starting a relocation process of said relocation from said first radio network controller to said second radio network controller.

7. The mobile communications system according to claim 6, wherein said information includes an MBMS service identifier, an IP (Internet Protocol) multicast address, and an APN (Access Point Name).

8. The mobile communications system according to claim 1, wherein the transferring of information of said service for said one of the radio terminals occurs during a relocation process of said relocation from said first radio network controller to said second radio network controller.

9. The mobile communications system according to claim 8, wherein said information is transferred from said first radio network controller to said second radio network controller by using a Relocation Commit message.

10. The mobile communications system according to claim 1, wherein said second radio network controller generates an MBMS Context.

11. The mobile communications system according to claim 1, wherein said second radio network controller generates an MBMS UE (User Equipment) Context Info in a UE Context.

12. The mobile communications system according to claim 1, wherein said second radio network controller transmits an MBMS Notification message on a dedicated channel or on a common channel according to an RRC (Radio Resource Control) State in an UE Context for said one of the radio terminals.

13. The mobile communications system according to claim 12, wherein said second radio network controller retrieves said UE Context by employing an IMSI (International Mobile Subscriber Identity) for said one of the radio terminals in an MBMS Service Context.

14. A method comprising the steps of:
relocating one of a plurality of radio terminals from a first radio network controller to a second radio network controller that is connected via a network to said first radio network controller, the network including an SGSN (Service GPRS (General Packet Radio Service) Support Node); and
during the relocating said first radio network controller transfers information of an MBMS (Multimedia Broadcast Multicast Service) to a second radio network controller via said SGSN,
wherein said information of said service for the one of the radio terminals is transferred by a Relocation Required message and a Relocation Request message, said information indicating that said one of the radio terminals has joined the MBMS is transparent to said SGSN.

15. The method according to claim 14, further comprising:
transferring said information of said service for the one of the radio terminals from said first radio network controller to said second radio network controller when starting said relocating.

16. The method according to claim 15, wherein said information of said service for the one of the radio terminals is transferred from said first radio network controller to said second radio network controller via said network.

17. The method according to claim 14, further comprising:
transferring said information of said service for the one of the radio terminals from said first radio network controller to said second radio network controller during said relocating.

18. The method according to claim 17, wherein said information of said service for the one of the radio terminals is transferred from said first radio network controller to said second radio network controller by using a Relocation Commit message.

19. The method according to claim 14, further comprising the step of transferring said information of said service for the one of the radio terminals from said first radio network controller to said second radio network controller when starting said relocating.

20. The method according to claim 19, wherein said information includes an MBMS service identifier, an IP (internet protocol) multicast address and an APN (Access Point Name).

21. The method according to claim 14, further comprising the step of transferring said information of said service for the one of the radio terminals from said first radio network controller to said second radio network controller during said relocating.

22. The method according to claim 21, wherein said information of said service for the one of the radio terminals is transferred from said first radio network controller to said second radio network controller by using a Relocation Commit message.

23. The method according to claim 21, wherein said information of said service for the one of the radio terminals is transferred from said first radio network controller to said second radio network controller by said SGSN.

24. The method according to claim 21, wherein said information includes an MBMS service identifier, an IP (internet protocol) multicast address and an APN (Access Point Name).

25. The method according to claim 14, further comprising the step of transferring said information of said service for the one of the radio terminals from said first radio network controller to said second radio network controller after a relocation process of said relocation from said first radio network controller to said second radio network controller.

26. The method according to claim 14, wherein said second radio network controller generates an MBMS Context.

27. The method according to claim 14, wherein said second radio network controller generates an MBMS UE (User Equipment) Context Info in a UE Context.

28. The method according to claim 14, wherein said second radio network controller transmits an MBMS Notification message on a dedicated channel or on a common channel according to an RRC (Radio Resource Control) State in an UE Context for said one of the radio terminals.

29. The method according to claim 28, wherein said second radio network controller retrieves said UE Context by employing an IMSI (International Mobile Subscriber Identity) for said one of the radio terminals in an MBMS Service Context.

30. The method according to claim 14, wherein said SGSN is transparent for said information.

31. The method according to claim 14, wherein said information of said service for the one of the radio terminals includes an MBMS service identifier, an IP (Internet Protocol) multicast address, and an APN (Access Point Name).

32. A mobile communications system, comprising:

a plurality of radio terminals;

first radio network control means for controlling a first radio network;

second radio network control means for controlling a second radio network; and network means for connecting said first radio network control means and said second radio network control means, the network means includes an SGSN (Service GPRS (General Packet Radio Service) Support Node), wherein during a relocation for one of the plurality of radio terminals from said first radio network control means to said second radio network control means, said first radio network control means transfers information of an MBMS (Multimedia Broadcast Multicast Service) to said second radio network control means via said SGSN, and wherein said information of said service for the one of the radio terminals is transferred by a Relocation Required message and a Relocation Request message, said information indicating that said one of the radio terminals has joined the MBMS is transparent to said SGSN.

* * * * *